(12) United States Patent
Perego et al.

(10) Patent No.: US 9,464,963 B2
(45) Date of Patent: *Oct. 11, 2016

(54) IMPACT DETECTION DEVICE ON A FORK OF A VEHICLE

(71) Applicant: DAINESE S.P.A., Molvena (IT)

(72) Inventors: Mattia Perego, Gallarate (IT); Cristian Previtali, Bonate Sopra (IT); Enrico Silani, Gavirate (IT)

(73) Assignee: DAINESE S.P.A., Molvena (IT)

( * ) Notice: Subject to any disclaimer, the term of this patent is extended or adjusted under 35 U.S.C. 154(b) by 219 days.

This patent is subject to a terminal disclaimer.

(21) Appl. No.: 14/359,882

(22) PCT Filed: Nov. 23, 2012

(86) PCT No.: PCT/IB2012/056670
§ 371 (c)(1),
(2) Date: May 21, 2014

(87) PCT Pub. No.: WO2013/076695
PCT Pub. Date: May 30, 2013

(65) Prior Publication Data
US 2015/0168265 A1 Jun. 18, 2015

(30) Foreign Application Priority Data
Nov. 24, 2011 (IT) .............................. VR2011A0209

(51) Int. Cl.
*G01M 7/00* (2006.01)
*B60K 28/10* (2006.01)
*B60R 21/00* (2006.01)
*G01M 17/007* (2006.01)
*B62J 27/00* (2006.01)

(52) U.S. Cl.
CPC ........... *G01M 17/0078* (2013.01); *B62J 27/00* (2013.01); *B62K 2207/00* (2013.01)

(58) Field of Classification Search
None
See application file for complete search history.

(56) References Cited

U.S. PATENT DOCUMENTS

| | | | |
|---|---|---|---|
| 5,542,297 A | 8/1996 | Mizuno et al. | |
| 6,908,103 B2* | 6/2005 | Umeda | A41D 13/018 2/462 |
| 7,124,852 B2* | 10/2006 | Hasegawa | B60R 21/0132 180/282 |
| 7,997,613 B2* | 8/2011 | Kobayashi | A41D 13/018 180/281 |

(Continued)

FOREIGN PATENT DOCUMENTS

| | | |
|---|---|---|
| WO | 2010/037931 | 8/2010 |
| WO | 2013/076694 | 5/2013 |

OTHER PUBLICATIONS

PCT Written Opinion mailed on May 7, 2013 for PCT/IB2012/056668 filed on Nov. 23, 2012.

(Continued)

*Primary Examiner* — Michael A Lyons
*Assistant Examiner* — Jermaine Jenkins
(74) *Attorney, Agent, or Firm* — Steinfl & Bruno, LLP

(57) ABSTRACT

A method for positioning an impact detection device on a fork of a vehicle supporting a wheel of the vehicle, in which the fork has a right-hand rod-shaped member and a left-hand rod-shaped member is described. The impact detection device has at least one first sensor unit associated with the right-hand rod-shaped member and a second sensor unit associated with the left-hand rod-shaped member. The second sensor unit is mounted inverted or rotated by an angle of 180 degrees around a steering axis of the wheel.

15 Claims, 2 Drawing Sheets

(56) References Cited

U.S. PATENT DOCUMENTS

| | | | |
|---|---|---|---|
| 2007/0051551 A1* | 3/2007 | Kobayashi | B60R 21/013 180/274 |
| 2010/0010709 A1* | 1/2010 | Song | B62K 21/20 701/37 |
| 2014/0318245 A1* | 10/2014 | Perego | B62J 27/00 73/510 |

OTHER PUBLICATIONS

PCT Written Opinion mailed on Mar. 7, 2013 for PCT/IB2012/056670 filed on Nov. 23, 2012.

PCT International Search Report mailed on May 7, 2013 for PCT/IB2012/056668 filed on Nov. 23, 2012.

PCT International Search Report mailed on Mar. 7, 2013 for PCT/IB2012/056670 filed on Nov. 23, 2012.

\* cited by examiner

IMPACT DETECTION DEVICE ON A FORK OF A VEHICLE

CROSS REFERENCE TO RELATED APPLICATIONS

The present application is the US national stage of International Patent Application PCT/IB2012/056670 filed on Nov. 23, 2012 which, in turn, claims priority to Italian Patent Application VR2011A000209 filed on Nov. 24, 2011.

The present disclosure relates in general to the detection of impacts in a vehicle, for example a wheeled vehicle, with particular but not exclusive reference to the sector of motorcycles. More particularly, the disclosure relates to the positioning of an impact detection device on a motorcycle, suitable for allowing activation of an automatic impact protection system.

In the sector of motorcycles and in particular motorcyclists' clothing, automatic impact protection systems, generally associated with jackets and one-piece suits, are increasingly common. The automatic protection systems generally comprise a plurality of air-bags which can be automatically activated in the event of an accident so as to protect the motorcyclist from the impact when falling and/or during a collision with other vehicles.

At present automatic protection systems of the wireless type are increasingly common, activation of the air-bag being managed in these systems by a remote control unit connected to an impact detection device comprising one or more accelerometers. The accelerometers of the detection device are able to detect the accelerations to which the motorcycle is subject during travel and in particular the negative accelerations which affect the vehicle in the event of an impact. The electric signals generated by the accelerometers are sent to the control unit which, when a predetermined deceleration threshold is exceeded, activates the air-bags.

The impact detection device is generally mounted on the motorcycle and in particular in the vicinity of the axle of the front wheel. This arrangement is considered to be the most suitable for detecting the accelerations acting on the motorcycle and in particular the negative accelerations in the event of an accident.

The present disclosure is based on the recognition by the inventors of the present invention disclosed herein that, by means of a particular arrangement of sensor units on a right-hand rod-shaped member and on a left-hand rod-shaped member of the fork, it is possible to obtain improved detection of the impact on the vehicle, and in particular in relation to the fork, said improved detection taking into account components of the acceleration signals arising from steering of the fork and/or the motorcycle to the right or to the left.

This recognition forms the basis for the provision of a positioning method, the main characteristic features of which are respectively specified in claim 1, while other characteristic features are specified in the remaining claims. Said objects are also achieved by an assembly consisting of an impact detection device and a fork according to claim 9.

In particular, the present disclosure relates to a method in which the two sensor units, namely the right-hand sensor unit and the left-hand sensor unit are arranged inverted or rotated by an angle of 180 degrees with respect to each other around the steering axis with rotation being centred on the steering axis, so that the measurement axes have the same direction but opposite sense.

Owing to this arrangement of the two sensor units, which are positioned on a right-hand rod-shaped member and on a left-hand rod-shaped member and inverted by an angle of 180 degrees with respect to the steering axis, it is possible to perform a suitable calculation of the average of the accelerations measured and, on the basis of this average, take account of, and eliminate, any acceleration/deceleration components due to steering.

The acceleration values measured may then be transferred to a conventional reference system of the motorcycle so as to define impact situations the entire motorcycle.

In fact, owing to the arrangement of the two sensor units, on the one hand it is possible to calculate an average of the values measured so as to obtain a measurement value which takes account of any accelerations due to steering, and, by means of suitable rotations, to relate also the measurement axes of the sensor units to the system in which a calculation algorithm is used (corresponding to a conventional standard system of vehicle accelerations). In particular, this conventional system of vehicle accelerations normally envisages a vertical measurement axis, a measurement axis in a lateral direction relative to the direction of forward movement of the vehicle, and a measurement axis in the direction of forward movement of the vehicle.

In one embodiment, each sensor unit includes a single accelerometer or a pair of accelerometers. The accelerometer or pair of accelerometers of a sensor unit has a respective measurement axis which has the same direction but opposite sense compared to the measurement axis of the accelerometer or pair of accelerometers of the other sensor unit.

In a further embodiment, each sensor unit includes a group of three triaxial accelerometers, namely a group comprising accelerometers arranged along three axes orthogonal to each other. For example, one accelerometer is suitable for measuring an acceleration along an axis parallel to the rod-shaped member of the fork, and two accelerometers are suitable for measuring accelerations in a plane orthogonal to the rod-shaped member of the fork.

By using three accelerometers for each sensor unit it is possible to relate, by means of suitable mathematical operations, the acceleration values detected by each accelerometer to all three orthogonal reference axes of the motorcycle, mentioned above, in particular the three main axes relative to which the rolling, pitching and yawing movements are defined.

In one embodiment of the present disclosure, the impact detection device includes printed circuit boards on which the accelerometers are mounted, the printed circuit boards being arranged in a plane which is parallel to a plane which contains the rod-shaped members, and are therefore arranged parallel to the respective rod-shaped members.

The inventor has in fact noted that the printed circuit boards which allow detection of the accelerations in fact normally require printed circuit boards which have fairly large dimensions in plan view compared to those of the individual accelerometers.

Moreover, the inventor has noted that, in order to detect accelerations along three axes which are perpendicular to each other, it is necessary to arrange the accelerometers and the associated printed circuits perpendicularly with respect to each other, which, in the case of three accelerometers for each unit, increases the overall dimensions of the detection device.

As a result, by arranging the printed circuit boards parallel to the rod-shaped members of the fork, it is possible to minimize the dimensions of the impact detection device in particular in the transverse direction of the motorcycle, reducing the visual impact thereof and possible negative effect on the appearance.

According to an embodiment of the present disclosure, the detection device comprises a pair of printed circuit boards which are arranged at right angles and on which the accelerometers for the X and Y axes and for the Z axis are respectively mounted. The printed circuit boards on which the accelerometers are mounted are arranged inclined at 45 degrees with respect to a median plane of the wheel, thus forming an arrangement characterized by dimensions which are very small in the transverse direction.

According to a further embodiment of the present disclosure, the detection device comprises a single printed circuit board on which two conventional accelerometers for the X and Y axes, respectively, and a third accelerometer able to detect accelerations on a axis Z perpendicular to the axes X and Y are mounted.

Further advantages, characteristic features and modes of use of the subject of the present disclosure will become clear from the following detailed description of a number of preferred embodiments thereof, provided by way of a non-limiting example. It is clear, however, that each embodiment may have one or more of the advantages listed above; in any case it is not required that each embodiment should have simultaneously all the advantages listed.

It is also to be understood that the scope of the present disclosure embraces all the possible combinations of the embodiments mentioned above and those described with reference to the following detailed description.

Reference shall be made to the figures in the accompanying drawings in which.

With reference to the Figures, an impact detection device 10 comprises a first sensor unit S1 and a second sensor unit S2, which are identical in terms of structure and form, and are respectively mounted on each of the right-hand and left-hand rod-shaped members of the fork F of the motorcycle M, for example the left-hand and right-hand stems Fsx, Fdx.

In particular, the first sensor unit S1 and second sensor unit S2 are in opposite positions with respect to a longitudinal median plane P of the wheel W. According to a further aspect of the present disclosure, the two sensor units S1 and S2 are arranged, as is visible in FIG. 4, oriented inverted by 180 degrees with respect to each other about a steering axis ST of a wheel (W), with rotation centred on the steering axis ST.

The steering axis ST coincides with an axis parallel to the right-hand rod-shaped member Fdx and the left-hand rod-shaped member Fsx and is contained in the longitudinal median plane of the fork F passing parallel between the right-hand stem Fdx and the left-hand stem Fsx.

According to one aspect of the present disclosure, the position of two sensor units S1 and S2 allows redundancy characteristics to be obtained during detection of the accelerations. As a result of mounting of the two sensor units S1 and S2, it is possible to cancel out the accelerations which arise as a result of rotation of the wheel during steering of the motorcycle M, which would inevitably affect the general calculation of the accelerations.

In the example of embodiment shown, one sensor unit S1 includes at least one accelerometer with a measurement axis which is arranged so as to have the same direction but opposite sense compared to the measurement axis of the other sensor unit S2.

Figure 3:
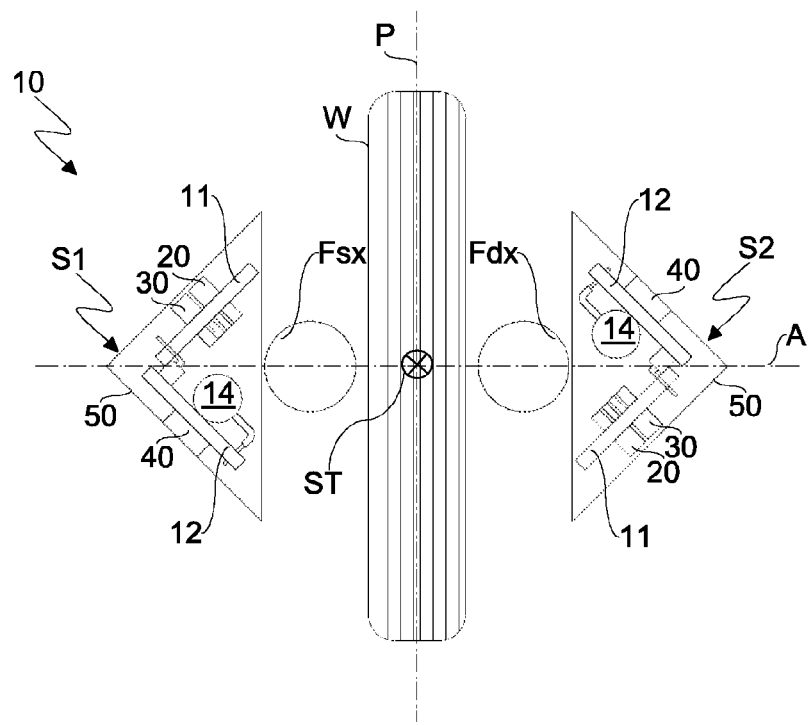
FIG. 3 is a top-plan view which shows in schematic form positioning of the impact detection device with respect to the fork of the motorcycle.

Even more particularly, as shown in FIG. 3, each sensor unit S1 and S2 is a triaxial sensor unit and comprises in particular a group of three accelerometers 20, 30, 40 arranged along three axes X Y and Z perpendicular to each other and suitable for detecting accelerations respectively directed along these axes.

Figure 4:
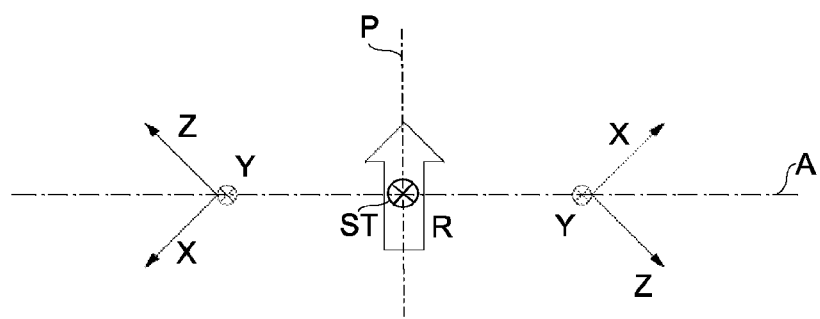
FIG. 4 is a diagram which shows the arrangement of the reference axes of the accelerometers of the impact detection device with respect to the fork of the motorcycle.

With reference now to FIG. 4, it can be noted that the axes Y of each group of three accelerometers are oriented in the same direction and are parallel to the axes of the stems Fsx, Fdx of the fork F. The axes X and Z are perpendicular to each other and inclined at 45 degrees with respect to the longitudinal median plane P of the wheel W. The axes Y of each group of three accelerometers are in particular directed towards the ground.

With respect to the direction of forward movement of the motor vehicle M, indicated in the figure by means of an arrow R, in the left-hand stem Fsx the axis Z is inclined by 135 degrees with respect to the axis A of rotation of the wheel W, while the axis X is inclined by −130 degrees with respect to the axis A of rotation of the wheel W. In the right-hand stem Fdx, instead, the axis Z is inclined by −45 degrees with respect to the axis A rotation of the wheel W, while the axis X is inclined by 45 degrees with respect to the axis A of rotation of the wheel W. The groups of three accelerometers are therefore arranged inverted, namely are arranged asymmetrically with respect to the axis A of rotation of the wheel W of the motorcycle M.

Figure 2:
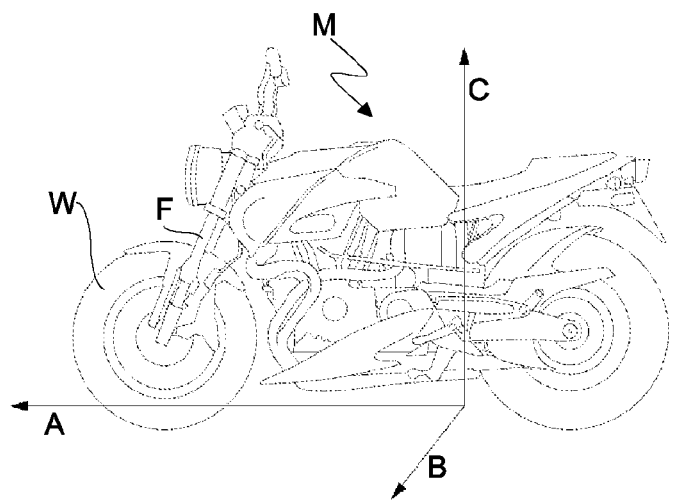
FIG. 2 shows in schematic form a motorcycle on the fork of which the impact detection device according to FIG. 1 is mounted.

Comparing FIG. 4 with FIG. 2, it can be understood that the arrangement of the accelerometers 20, 30, 40, and therefore of the axes X, Y, Z, arising from the configuration and the positioning of the detection device 10 described above, does not correspond to the three main axes or reference axes of the motorcycle M, which are indicated respectively by the letters A, B and C and which respectively represent the rolling, pitching and yawing axes.

In order to be able to perform calculations using the accelerations detected by the accelerometers 20, 30, 40, from a mathematical point of view conversion matrices must therefore be applied, "virtually" rotating the group of three accelerometers about their axes in successive steps so as to align them with the three main axes.

Still with reference to the embodiment shown in FIGS. 3 and 4, in both the groups of three accelerometers the sense of the axis Z is initially inverted.

For the group of three accelerometers associated with the left-hand stem Fsx of the fork F it is required to perform a first rotation through 45 degrees around the axis Y, a second rotation by −90 degrees around the axis Z which arises from the first rotation and finally a third rotation by 90 degrees around the axis Y which arises from the second rotation. The angle of the third rotation must furthermore be increased by the angle of inclination of the fork with respect to the ground, typically by about 26 degrees.

Similarly, for the group of three accelerometers associated with the right-hand stem Fdx of the fork F it is required to perform a first rotation by −135 degrees around the axis Y, a second rotation by −90 degrees around the axis Z which arises from the first rotation and finally a third rotation by 90 degrees around the axis Y which arises from the second rotation. In this case also, the angle of the third rotation must furthermore be increased by the angle of inclination of the fork with respect to the ground, typically by about 26 degrees.

As a result of the asymmetrical mirror arrangement, i.e. inverted by 180 degrees, of the two sensor units of the two groups of three accelerometers, it is possible to minimize the virtual rotation operations needed to make them coincide with the three main axes of the motorcycle M, with the advantage of a greater rapidity of the control system during analysis of the data sent by the accelerometers in order to determine the impact situations and activate the air-bags of the protection system.

From a constructional point of view, in the embodiment shown in the figures, a first accelerator and a second accelerator are coplanar and may be mounted on a first printed circuit board, and a third accelerometer mounted on a second printed circuit board arranged perpendicularly with respect to the first printed circuit board.

In the embodiment shown, the accelerometers 20, 30 arranged along the axes X and Y are coplanar and are both mounted on a first printed circuit board 11, while the accelerometer 40 arranged along the axis Z is mounted on a second printed circuit board 12 connected to the first printed circuit board 11 by means of a right-angled connector 13.

The detection device 10 also comprises a cable 14 for connection to a transmitting unit (not shown) suitable for transmitting the electric signals emitted by the accelerometers 20, 30, 40 to a receiving unit (not shown) of an automatic protection system (not shown) comprising a plurality of air-bags, for example associated with a motorcyclist's jacket or suit. The group of three accelerometers 20, 30, 40 with the respective printed circuit boards 11, 12 are housed inside a container 50 shown schematically in broken lines in FIG. 1.

It may be understood, however, that the accelerometers mounted on the printed circuit boards may be all of the same type and that the association of the electric signals generated by them with accelerations along the three axes X, Y, Z is merely conventional. For example, the two accelerometers 20, 30 mounted on the first printed circuit board 11 could be associated with axes, Z and the accelerometer 40 mounted on the second printed circuit board could be associated with the axis Y.

In the embodiment shown, the container 50 has a prismatic shape which is substantially triangular in plan view and reproduces the arrangement of the printed circuit boards 11, 12.

In the example of embodiment shown, the detection device 10 is arranged so that the printed circuit boards 11, 12 are parallel to the axis of the fork F, namely are arranged in planes parallel to the rod-shaped members Fsx, Fdx of the fork F. In this way it is possible to minimize the dimensions of the detection device 10 in the transverse direction, since the printed circuit boards, and likewise the components mounted thereon, do not occupy much space in the direction of the thickness, while they have generally much larger dimensions as regards the planes in which the components are mounted and in which the conduction paths are formed.

In the embodiment shown in FIG. 3, the printed circuit boards 11, 12 are preferably arranged inclined at 45 degrees with respect to a longitudinal median plane P of the wheel W (namely in the median plane P of the fork F) and symmetrically with respect to its axis A of rotation, which passes through the end zones of the rod-shaped members Fsx, Fdx of the fork F.

Figure 1:
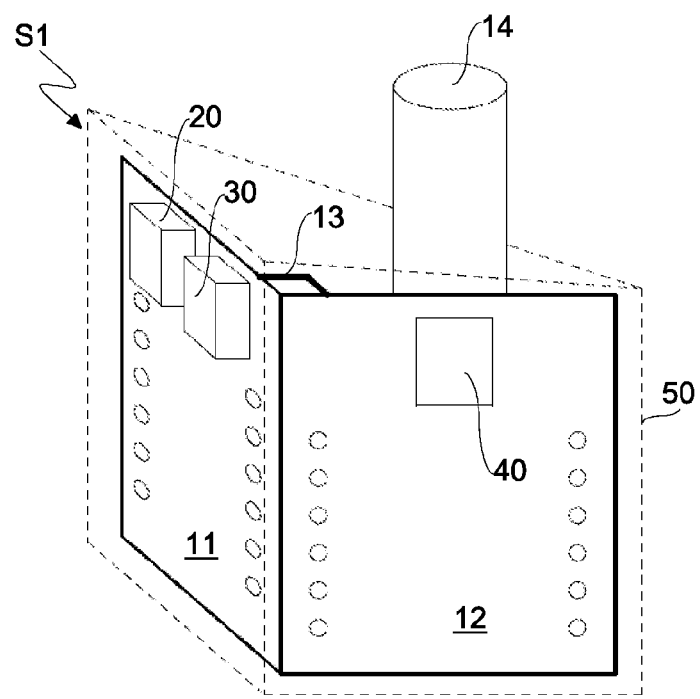
FIG. 1 is a perspective view which shows in schematic form an impact detection device comprising a group of three accelerometers arranged along three orthogonal axes.

This configuration is able to minimize the dimensions of the detection device 10 transversely with respect to the motorcycle M since, considering the embodiment shown in FIG. 1 which comprises a prismatic container 50 with a triangular base, the base of the triangle is parallel to the longitudinal median plane P of the wheel W and the inclined sides are directed towards the outside of the motorcycle M.

The embodiments of the present disclosure which are described and illustrated here constitute only examples which may be subject to numerous variations. For example, it is possible to form the detection device using a single printed circuit board for mounting two conventional accelerometers, for example those used in the embodiment described above, for the axes X, Y, and a third accelerometer which is coplanar with them, but able to detect accelerations on an axis Z perpendicular to the axes X, Y. In this way, the dimensions of the detection device 10 are further limited transversely with respect to the motorcycle M without complicating the calculation as regards the virtual rotations required to relate the two groups of three accelerometers to the three main axes of the motorcycle M. Moreover, it is possible to use the detection device according to the present disclosure also in combination with "external" elements such as air-bags and receiving control units arranged on the motorcycle or, more generally, on a wheeled vehicle, and not exclusively in the garments worn by the motorcyclist.

The invention claimed is:

1. A method for positioning an impact detection device on a right-hand rod-shaped member and on a left-hand rod-shaped member of a fork of a vehicle, comprising
supporting a wheel of the vehicle with said fork,
associating at least a first sensor unit of said impact detection device with said right-hand rod-shaped member and a second sensor unit of said impact detection device with said left-hand rod-shaped member, and
mounting said second sensor unit inverted or rotated relative to the first sensor unit by an angle of 180 degrees around a steering axis of the wheel, wherein the first sensor unit comprises at least one pair of accelerometers orthogonal to each other and suitable for measuring respective accelerations along two measurement axes and said second sensor unit comprises a pair of accelerometers orthogonal to each other and suitable for measuring respective accelerations along two measurement axes, and
wherein the measurement axes of the pair of accelerometers of the first sensor unit have the same direction and opposite sense relative to corresponding measurement axes of the pair of accelerometers of the second sensor unit.

2. The method according to claim 1, wherein the first sensor unit is associated with a third accelerometer for measuring a respective acceleration along a measurement axis orthogonal to the measurement axes of the accelerometers of the pair so as to define a first group of three accelerometers with axes orthogonal to each other, and
wherein the second sensor unit is associated with a third accelerometer for measuring a respective acceleration along a measurement axis orthogonal to the measurement axes of the accelerometers of the pair so as to define a second group of three accelerometers with axes orthogonal to each other, whereby the two groups of three accelerometers are arranged rotated relative to each other by an angle of 180 degrees around said steering axis of the wheel with rotation being centred on said steering axis.

3. The method according to claim 2, wherein the third accelerometer of the first group of three accelerometers and the third accelerometer of the second group of three accelerometers are arranged with their respective measurement axes oriented along the longitudinal axis of the respective right-hand rod-shaped member and respective left-hand rod-shaped member.

4. The method according to claim 1, wherein each of the measurement axes of the first pair of accelerometers and each of the measurement axis of the second pair of accelerometers form an angle of 45 degrees with a longitudinal median plane passing through the wheel, or with an axis of rotation of the wheel.

5. A method for positioning an impact detection device on a right-hand rod-shaped member and on a left-hand rod-shaped member of a fork of a vehicle, comprising
supporting a wheel of the vehicle with said fork,
associating at least a first sensor unit of said impact detection device with said right-hand rod-shaped member and a second sensor unit of said impact detection device with said left-hand rod-shaped member, and
mounting said second sensor unit inverted or rotated relative to the first sensor unit by an angle of 180 degrees around a steering axis of the wheel, wherein two accelerometers of the first sensor unit and two accelerometers of the second sensor unit are mounted on at least one printed circuit board, and
wherein said at least one printed circuit board is arranged in a plane parallel to a plane passing through a longitudinal axis of the right-hand rod-shaped member and through a longitudinal axis of the left-hand rod-shaped member of the fork, respectively.

6. The method according to claim 5, wherein all the accelerometers of each group of three accelerometers are mounted on a common printed circuit board.

7. An assembly comprising:
an impact detection device; and
a fork suitable for supporting a wheel of a vehicle, wherein:
said fork comprising a right-hand rod-shaped member and a left-hand rod-shaped member,
said impact detection device comprising at least a first sensor unit associated with said right-hand rod-shaped member and a second sensor unit associated with said left-hand rod-shaped member, and
wherein said second sensor unit is mounted inverted or rotated by an angle of 180 degrees around a steering axis of the wheel, wherein the first sensor unit comprises at least one pair of accelerometers orthogonal to each other and suitable for measuring respective accelerations along two measurement axes and said second sensor unit comprises a pair of accelerometers orthogonal to each other and suitable for measuring respective accelerations along two measurement axes, and
wherein the measurement axes of the pair of accelerometers of the first sensor unit have the same direction and opposite sense relative to corresponding measurement axes of the pair of accelerometers of the second sensor unit.

8. The assembly according to claim 7, wherein the first sensor unit comprises a third accelerometer for measuring a respective acceleration along a measurement axis orthogonal to the measurement axes of the accelerometers of the first pair so as to define a first group of three accelerometers with axes orthogonal to each other, and
wherein the second sensor unit comprises a third accelerometer for measuring a respective acceleration along a measurement axis orthogonal to the measurement axes of the three accelerometers of the pair to define a second group of three accelerometers with axes orthogonal to each other, whereby the two groups of three are arranged rotated relative to each other by an angle of 180 degrees around said steering axis of the wheel with rotation being centred on said steering axis.

9. The assembly according to claim 8, wherein the third accelerometer of the first group of three accelerometers and the third accelerometer of the second group of three accelerometers have a respective measurement axis parallel to the longitudinal axis of the respective right-hand rod-shaped member and respective left-hand rod-shaped member.

10. The assembly according to claim 7, wherein each of the measurement axes of the first pair of accelerometers and each of the measurement axes of the second pair of accelerometers form an angle of 45 degrees with a longitudinal median plane passing through the wheel, or with an axis of rotation of the wheel.

11. The assembly according to claim 7, wherein the first sensor unit comprises a third accelerometer for measuring a respective acceleration along a measurement axis orthogonal to the measurement axes of the accelerometers of the first pair to define a first group of three accelerometers with axes orthogonal to each other,
wherein the second sensor unit comprises a third accelerometer for measuring a respective acceleration along a measurement axis orthogonal to the measurement axes of the three accelerometers of the pair to define a second group of three accelerometers with axes orthogonal to each other, whereby the two groups of three accelerometers are arranged rotated relative to each other by an angle of 180 degrees around said steering axis of the wheel with rotation being centred on said steering axis, and
wherein all the accelerometers of each group of three accelerometers are mounted on a common printed circuit board.

12. The assembly according to claim 7, wherein the first sensor unit comprises a third accelerometer for measuring a respective acceleration along a measurement axis orthogonal to the measurement axes of the accelerometers of the first pair to define a first group of three accelerometers with axes orthogonal to each other,
wherein the second sensor unit comprises a third accelerometer for measuring a respective acceleration along a measurement axis orthogonal to the measurement axes of the three accelerometers of the pair to define a second group of three accelerometers with axes orthogonal to each other, whereby the two groups of three accelerometers are arranged rotated relative to each other by an angle of 180 degrees around said steering axis of the wheel with rotation being centred on said steering axis,
wherein a first accelerometer and a second accelerometer of each group of three accelerometers are coplanar and mounted on a first printed circuit board and a third accelerometer is mounted on a second printed circuit board perpendicularly with respect to said first printed circuit board, and
wherein said first and second printed circuit boards are arranged in planes parallel to a plane passing through a longitudinal axis of the right-hand rod-shaped member and through longitudinal axis of the left-hand rod-shaped member of the fork, respectively.

13. A wheeled vehicle comprising an impact detection device, wherein said detection device comprises the assembly of claim 7.

14. An assembly comprising:
an impact detection device; and
a fork suitable for supporting a wheel of a vehicle,
wherein:
said fork comprising a right-hand rod-shaped member and a left-hand rod-shaped member,
said impact detection device comprising at least a first sensor unit associated with said right-hand rod-shaped member and a second sensor unit associated with said left-hand rod-shaped member, and
wherein said second sensor unit is mounted inverted or rotated by an angle of 180 degrees around a steering axis of the wheel, wherein two accelerometers of the first sensor unit and two accelerometers of the second sensor unit are mounted on at least one printed circuit board, and
wherein said at least one printed circuit board is arranged in a plane parallel to a plane passing through a longitudinal axis of the right-hand rod-shaped member and through a longitudinal axis of the left-hand rod-shaped member of the fork respectively.

15. A wheeled vehicle comprising an impact detection device, wherein said detection device comprises the assembly of claim 14.

* * * * *